US 9,670,794 B2

(12) United States Patent
Takemura

(10) Patent No.: US 9,670,794 B2
(45) Date of Patent: Jun. 6, 2017

(54) STEAM VALVE AND STEAM TURBINE

(71) Applicant: MITSUBISHI HEAVY INDUSTRIES COMPRESSOR CORPORATION, Tokyo (JP)

(72) Inventor: Daisuke Takemura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 21 days.

(21) Appl. No.: 14/894,245

(22) PCT Filed: Feb. 19, 2014

(86) PCT No.: PCT/JP2014/053913
§ 371 (c)(1),
(2) Date: Nov. 25, 2015

(87) PCT Pub. No.: WO2015/125236
PCT Pub. Date: Aug. 27, 2015

(65) Prior Publication Data
US 2016/0123179 A1 May 5, 2016

(51) Int. Cl.
*F16K 31/12* (2006.01)
*F01D 17/14* (2006.01)
*F16K 31/44* (2006.01)

(52) U.S. Cl.
CPC ............ *F01D 17/145* (2013.01); *F16K 31/44* (2013.01); *F05D 2220/31* (2013.01);
(Continued)

(58) Field of Classification Search
CPC ............ F05D 2220/31; F05D 2230/31; F05D 2260/30; F05D 2260/60; F05D 2270/56;
(Continued)

(56) References Cited

U.S. PATENT DOCUMENTS 1,399,774 A 12/1921 Johnson
1,416,391 A * 5/1922 Van Brunt .............. F16K 31/44
137/625.38
(Continued)

FOREIGN PATENT DOCUMENTS

CN   101514641 A   8/2009
CN   102865109 A   1/2013
(Continued)

OTHER PUBLICATIONS

European Search Report mailed Apr. 26, 2016 in Application No. EP 14882909.6.
(Continued)

*Primary Examiner* — Umashankar Venkatesan
(74) *Attorney, Agent, or Firm* — Birch, Stewart, Kolasch & Birch, LLP

(57) ABSTRACT

A steam valve includes: a valve main body which has, on the inside thereof, a flow path through which steam flows, and has a valve seat formed in a portion of the flow path; a valve body which comes into contact with the valve seat, thereby shutting off the flow path, and is separated from the valve seat, thereby opening the flow path; a valve shaft which is connected to the valve body, extends in an upward direction from the valve body, and moves up and down, thereby bringing the valve body into contact with the valve seat and separating the valve body from the valve seat; a hydraulic drive unit which is disposed to be separated in a horizontal direction from the valve main body, at a position which does not overlap the valve main body in a case of being viewed from above, and has a drive rod which is driven forward and backward by oil pressure; a first link unit which connects the drive rod and the valve shaft and transmits the forward and backward drive of the drive rod to the valve shaft, thereby moving the valve shaft up and down; a second link unit connected to the valve main body; and a connection unit
(Continued)

which connects the second link unit and the first link unit and transmits a movement of the valve main body in the horizontal direction to the first link unit through the second link unit.

6 Claims, 2 Drawing Sheets

(52) U.S. Cl.
CPC ...... *F05D 2230/31* (2013.01); *F05D 2260/30* (2013.01); *F05D 2260/57* (2013.01); *F05D 2260/60* (2013.01); *F05D 2270/56* (2013.01); *F05D 2270/58* (2013.01); *F05D 2270/64* (2013.01)

(58) Field of Classification Search
CPC .. F05D 2270/58; F05D 2270/64; F16K 31/44; F01D 17/145
USPC .......................................................... 251/58
See application file for complete search history.

(56) References Cited

U.S. PATENT DOCUMENTS

| | | | | |
|---|---|---|---|---|
| 1,766,165 | A | * | 6/1930 | Beebe .................. F16K 31/44 251/236 |
| 2,225,321 | A | | 12/1940 | Schwendner |
| 2,668,556 | A | | 2/1954 | Meyer |
| 3,026,889 | A | | 3/1962 | Bryant |
| 3,970,280 | A | | 7/1976 | Kunz |
| 5,074,325 | A | | 12/1991 | Rumberger et al. |
| 5,333,989 | A | * | 8/1994 | Missana ................. F01D 17/10 251/129.04 |
| 5,967,486 | A | * | 10/1999 | McCrory ............. F16K 31/163 251/232 |
| 8,328,500 | B2 | * | 12/2012 | Colotte .................. F01D 17/16 415/149.4 |
| 2014/0234084 | A1 | * | 8/2014 | Katagake ............. F01D 17/145 415/151 |
| 2015/0322812 | A1 | * | 11/2015 | Futahashi ............... F01D 17/10 60/660 |

FOREIGN PATENT DOCUMENTS

| | | |
|---|---|---|
| JP | 48-066129 U | 8/1973 |
| JP | 51-050021 A | 5/1976 |
| JP | 59-6484 A | 1/1984 |
| JP | 4-219404 A | 8/1992 |
| JP | 5-53924 B | 8/1993 |
| JP | 2002-97903 A | 4/2002 |
| JP | 2003-056306 U | 2/2003 |

OTHER PUBLICATIONS

International Search Report issued in PCT Application No. PCT/JP2014/053913 on May 20, 2014 with an English translation.
Written Opinion issued in PCT Application No. PCT/JP2014/053913 on May 20, 2014 with an English translation.
Chinese Office Action and Search Report for Chinese Application No. 201480029042.6, dated Jun. 3, 2016, with an English translation.
Japanese Notice of Allowance for Japanese Application No. 2015-545225, dated Jun. 28, 2016, with an English translation.

* cited by examiner

STEAM VALVE AND STEAM TURBINE

TECHNICAL FIELD

The present invention relates to a steam valve, and a steam turbine which is provided with the steam valve.

BACKGROUND ART

A steam turbine is used for mechanical drive or the like and is provided with a turbine main body having a rotatably supported rotor. The rotor is rotationally driven by supplying steam as a working fluid to the turbine main body. The steam which is supplied to the turbine main body, or steam extracted from the turbine main body, flows in a steam flow path of the steam turbine. A steam valve is provided in the steam flow path. The flow rate of the steam which is supplied to the turbine main body can be adjusted by adjusting the degree to which the steam valve is opened.

Further, a steam stop valve having small flow rate adjustment and shut-off functions is provided in a steam valve front stream of a turbine inlet.

As such steam valve and steam stop valve, for example, a configuration as shown in PTL 1 is generally used. That is, the technique of PTL 1 has a link mechanism connected to a valve shaft, and a drive mechanism connected to the link mechanism.

CITATION LIST

Patent Literature

[PTL 1] Japanese Unexamined Patent Application Publication No. 2002-97903

SUMMARY OF INVENTION

Technical Problem

Here, in general, in a steam valve and a steam stop valve, a valve chamber disposed so as to surround a valve shaft causes thermal deformation or displacement due to heat, according to the operation of a steam turbine. However, in the steam valve disclosed in PTL 1 described above, a valve shaft is connected to a link mechanism, and therefore, it is difficult to cause thermal deformation or displacement. Therefore, during the operation of the steam turbine, a relative positional relationship between the valve chamber and the valve shaft is not appropriately maintained, and there is a possibility that fixation or partial contact of the steam valve may occur.

The present invention has been made in view of the above circumstances. The present invention has an object to provide a steam valve in which it is possible to appropriately perform opening and closing even during the operation of a steam turbine in which a steam valve and a steam stop valve are installed to be separated from the steam turbine, whereby excessive heat transfer occurs.

Solution to Problem

The present invention adopts the following means in order to solve the above problem.

According to a first aspect of the present invention, there is provided a steam valve including: a valve main body which has, on the inside thereof, a flow path through which steam flows, and has a valve seat formed in a portion of the flow path; a valve body which comes into contact with the valve seat, thereby shutting off the flow path, and is separated from the valve seat, thereby opening the flow path; a valve shaft which is connected to the valve body, extends in an upward direction from the valve body, and moves up and down, thereby bringing the valve body into contact with the valve seat and separating the valve body from the valve seat; a hydraulic drive unit which is disposed to be separated in a horizontal direction from the valve main body, at a position which does not overlap the valve main body in a case of being viewed from above, and has a drive rod which is driven forward and backward by oil pressure; a first link unit which connects the drive rod and the valve shaft and transmits the forward and backward drive of the drive rod to the valve shaft, thereby moving the valve shaft up and down; a second link unit connected to the valve main body; and a connection unit which connects the second link unit and the first link unit and transmits a movement of the valve main body in the horizontal direction to the first link unit through the second link unit.

According to such a configuration, even in a case where a movement in the horizontal direction occurs in the valve main body due to heat generated during the operation of a steam turbine, the movement in the horizontal direction is also transmitted to the valve shaft through the connection unit connecting the first link unit and the second link unit, and therefore, it is possible to maintain the relative positional relationship between the valve main body and the valve shaft (the valve body).

Further, in a steam valve according to another aspect of the present invention, a configuration may be made in which the first link unit has a valve shaft link unit connected to the valve shaft at one end thereof, a hydraulic link unit connected to the hydraulic drive unit at one end thereof, and a connection piece which connects the other end of the valve shaft link unit and the other end of the hydraulic link unit through respective spherical bearings and the steam valve further includes a bracket having a plurality of support portions, in which a first support portion is connected to the hydraulic link unit, a second support portion is connected to the second link unit through a spherical bearing, and a third support portion is connected to the hydraulic drive unit.

With such a configuration, even in a case where a movement in the horizontal direction occurs in the valve main body and the valve shaft due to heat generated during the operation of the steam turbine, it is possible for the movement to be absorbed by the spherical bearing, and therefore, the first link unit, the second link unit, and the bracket can appropriately operate.

In addition, in a steam valve according to another aspect of the present invention, a configuration may be made in which the connection piece extends along a vertical direction and the second support portion is disposed on an extended line in an extending direction of the connection piece.

With such a configuration, it is possible to convert a movement in the horizontal direction occurring in the valve main body and the valve shaft, into rotational motion with the vertical direction in which the connection piece extends, as a rotation axis, and therefore, the movement in the horizontal direction is not transmitted to the hydraulic drive unit.

Further, according to a second aspect of the present invention, there is provided a steam turbine which is provided with the steam valve according to each of the aspects described above.

Advantageous Effects of Invention

According to the steam valve and the steam turbine according to the present invention, even during the operation of a steam turbine in which excessive heat transfer to a valve occurs, it is possible to appropriately open and close the steam valve.

DESCRIPTION OF EMBODIMENTS

Hereinafter, a steam turbine according to an embodiment of the present invention will be described based on the drawings.

Figure 1:
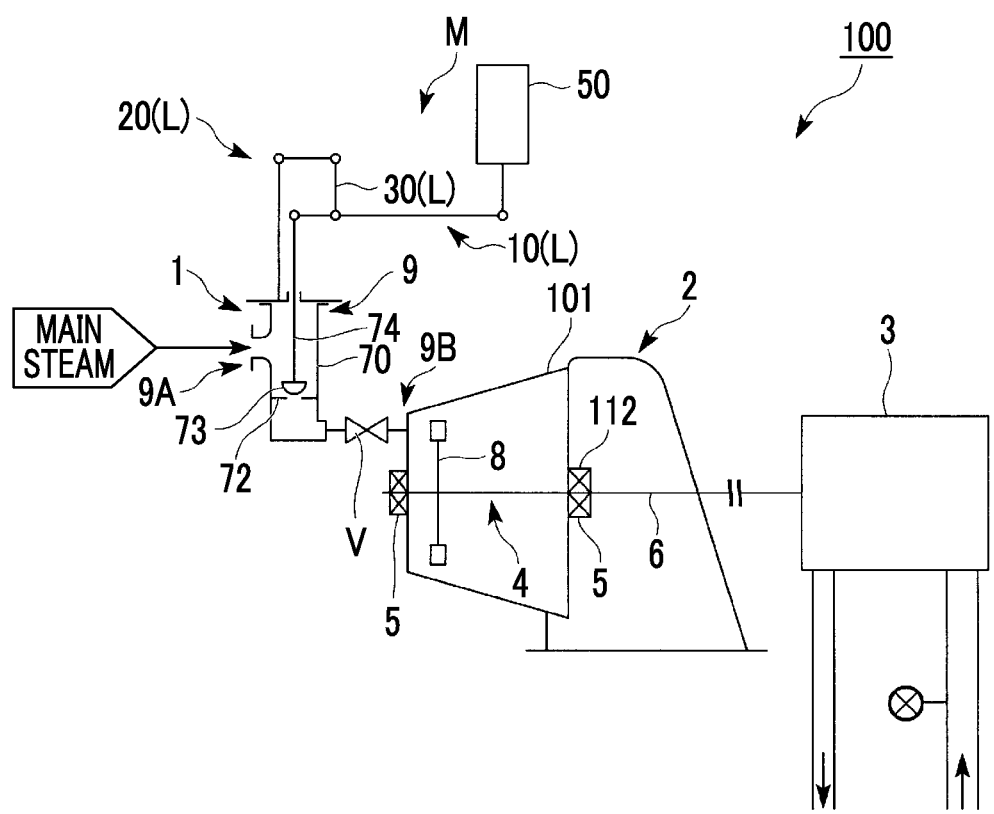
FIG. 1 is a diagram showing the outline of a steam turbine to which a steam valve according to an embodiment of the present invention is applied.

FIG. 1 is a schematic diagram showing the configuration of a steam turbine 100 of this embodiment.

As shown in FIG. 1, the steam turbine 100 of this embodiment is provided with a turbine main body 2, a steam flow path 9 through which steam as a working fluid flows, a compressor 3 which is driven by the turbine main body 2, a steam valve 1, and a steam valve opening and closing mechanism M for performing the opening and closing of the steam valve 1.

(Turbine Main Body)

The turbine main body 2 has a tubular casing 101, a bearing 5 provided in the casing 101, and a rotor 4 which is disposed to be rotatably supported on the bearing 5 on the inside of the casing 101. Then, the rotor 4 is provided with a rotary shaft 6, and a plurality of blades 8 fixed to the rotary shaft 6.

The blades 8 configured in this manner are rotated by steam and the compressor 3 is driven by the rotating force thereof.

(Steam Flow Path)

The steam flow path 9 is a flow path which supplies steam as a working fluid to the turbine main body 2.

Steam is introduced into the steam flow path 9 from a steam introduction port 9A on one end side thereof. A steam supply port 9B on the other end side of the steam flow path 9 is connected to the turbine main body 2. Further, a valve seat 72 having a narrowed flow path width is provided between the steam introduction port 9A and the steam supply port 9B. Further, an adjusting valve V which adjusts the flow rate of steam is provided on the downstream side of the valve seat 72.

In addition, in this embodiment, as the "steam flow path" related to the present invention, a flow path through which steam which is supplied to the turbine main body 2 flows, is described as an example. However, the steam flow path 9 is not limited thereto, and the steam flow path may be, for example, a flow path through which steam extracted from the turbine main body 2 flows.

(Steam Valve)

Subsequently, the structure of the steam valve 1 will be described with reference to FIG. 2. The steam valve 1 performs small flow rate adjustments at the time of turbine startup, and instant shut-off at the time of an emergency. The steam valve 1 has a valve main body 70 having the valve seat 72 on the steam flow path 9, a rod-shaped valve shaft 74, a valve body 73 provided at one end of the valve shaft 74, and a tubular body 76 which is connected to the valve main body 70 and surrounds the valve shaft 74 from the outside in a radial direction thereof.

In addition, in the following description, a direction toward the tubular body 76 from the valve main body 70 is referred to as an upward direction and a direction opposite to the upward direction is defined as a downward direction.

The valve main body 70 has a valve casing 70A which accommodates the valve body 73 and the valve shaft 74 therein, and a lid body 70B which covers an upper portion of the valve casing 70A. The valve casing 70A is a tubular member in which both ends in a vertical direction are open. A radial dimension in the upper portion of the valve casing 70A is set to be substantially constant. On the other hand, a radial dimension in a lower portion of the valve casing 70A is set so as to gradually decrease as it goes from the upper side toward the lower side.

An opening on the upper side of the valve casing 70A is blocked by the lid body 70B which is a disk-shaped member. A hole into which the valve shaft 74 is inserted is provided in a central portion of the lid body 70B. The hole is sealed by a sealing member (not shown) or the like, and thus air-tightness in the interior of the valve casing 70A is maintained.

A guide section 75 which guides the movement in the vertical direction of the valve shaft 74 is provided on the surface on the lower side of the lid body 70B. The guide section 75 is a tubular member which extends in the vertical direction and has a through-hole penetrating it in the vertical direction.

The valve seat 72 is disposed at the lower portion of the valve casing 70A. The valve seat 72 has a approximately tubular shape and is provided so as to cover the radial inner wall surface of the valve casing 70A. An upper end portion of the valve seat 72 has a diameter dimension and a shape corresponding to those of the valve body 73 (described later). In this way, the valve seat 72 and the valve body 73 are configured so as to come into contact with each other without a gap therebetween.

A portion of the valve casing 70A is open in the horizontal direction, thereby forming the steam introduction port 9A described above.

The valve shaft 74 has a valve shaft main body 74A and a valve shaft rod 74B. The valve shaft main body 74A is a substantially rod-shaped member which is disposed in the interior of the valve casing 70A. The valve body 73 is provided at an end portion on the lower side of the valve shaft main body 74A.

The valve body 73 is a member having the form of a bottomed cylinder when viewed in an outline view and has a circular bottom portion 73A extending in the horizontal direction and a peripheral wall portion 73B extending in the upward direction from an outer peripheral portion of the bottom portion 73A. The dimension from the outer peripheral surface of the valve shaft main body 74A to the peripheral wall portion 73B is set to be substantially equal to the dimension from the inner peripheral surface to the outer peripheral surface of the guide section 75 described above. That is, the valve body 73 and the guide section 75 are formed so as to be approximately fitted to each other in the vertical direction.

On the other hand, the surface on the upper side of the bottom portion 73A is flatly formed and is connected to an end portion on the lower side of the valve shaft main body 74A at a central portion thereof. The surface on the lower side of the bottom portion 73A is configured so as to protrude as a curved surface shape in the downward direction and to gradually reduce in diameter as it extends in the downward direction from the upward direction.

An end portion on the upper side of the valve shaft main body 74A is connected to a piston 77 (described later). Further, the valve shaft main body 74A is connected to the valve shaft rod 74B through the piston 77.

The piston 77 is a member formed in a disc shape when viewed in an outline view. The radial dimension of the piston 77 is set to be substantially equal to the inner diameter of the tubular body 76 (described later). A steam valve spring 79 (described later) is fixed to the surface on upper side of the piston 77. Further, a plate-shaped piston rib 77A protruding in the upward direction is provided in an area in the vicinity of a central portion of the piston 77. A hole penetrating the piston rib 77A in the horizontal direction is provided in the vicinity of an upper end portion of the piston rib 77A.

The valve shaft rod 74B is a substantially rod-shaped member extending in the vertical direction. Hole portions 67 and 69 are provided in both end portions of the valve shaft rod 74B. The hole portions 67 and 69 are through-holes which penetrate the valve shaft rod 74B in the horizontal direction. Known bearing devices such as rolling bearings are disposed in the hole portions 67 and 69.

The valve shaft rod 74B is rotatably connected to the piston 77 and the valve shaft 74 through the hole provided in the piston rib 77A described above. More specifically, in a state where the hole portion 69 which is located on the lower end side of the valve shaft rod 74B and the hole provided in the piston rib 77A described above overlap each other in the horizontal direction, a rod-shaped pin 69A is inserted into the hole, whereby the valve shaft rod 74B is rotatably connected to the piston 77 and the valve shaft 74.

Further, an end portion on the upper side of the valve shaft rod 74B is connected to a first link unit 10 (described later) through the hole portion 67.

The steam valve spring 79 is a coil spring disposed in the vertical direction so as to cover the valve shaft rod 74B from an outer peripheral direction. An end portion on the lower side of the steam valve spring 79 is fixed to the piston 77 and an end portion on the upper side is fixed to the surface on the lower side of a tubular body cover 78 which blocks the tubular body 76 from above.

The tubular body 76 is a tubular member provided at an upper portion of the valve main body 70 with the lid body 70B interposed therebetween. The piston 77 connected to the valve shaft 74, the valve shaft rod 74B, and the steam valve spring 79 are accommodated in a radially inner space of the tubular body 76. The tubular body cover 78 blocking the space is provided at an upper portion of the tubular body 76.

The tubular body cover 78 is a circular member when viewed in a top view and has a radial dimension substantially equal to that of the tubular body 76. A rod penetrating hole 78A which penetrates the tubular body cover 78 in the vertical direction is provided in an area which includes the center of the tubular body cover 78. The valve shaft rod 74B is inserted into the rod penetrating hole 78A. The dimension of the rod penetrating hole 78A is formed to be slightly larger than the dimension in the horizontal direction of the valve shaft rod 74B.

A rib 80 which is supported through a rib support structure 81 is provided above from the tubular body cover 78. The rib support structure 81 is a tubular member extending upward from the surface on the upper side of the tubular body cover 78. A portion of a peripheral wall of the rib support structure 81 is open in the horizontal direction. The first link unit 10 of the steam valve opening and closing mechanism M (described later) is inserted into the opening. That is, the rib support structure 81 and the first link unit 10 are made so as to be able to operate without interfering with each other.

The rib 80 is a plate-shaped member extending upward from an upper portion of the rib support structure 81. A hole portion 80A for connecting the rib 80 and a second link unit 20 (described later) is provided in the vicinity of an end edge on the upper side of the rib 80. That is, the second link unit 20 and the valve main body 70 are connected to each other through the rib 80, the rib support structure 81, and the tubular body 76.

(Steam Valve Opening and Closing Mechanism)

In the steam valve 1 configured as described above, the valve shaft 74 moves in the vertical direction by the operation of the steam valve opening and closing mechanism M. In this way, the valve seat 72 and the valve body 73 come into contact with each other and are separated from each other, and thus the opening and the shut-off of the steam flow path 9 are performed.

The steam valve opening and closing mechanism M has a hydraulic drive unit 50 and a linking device L connected to the hydraulic drive unit 50.

The hydraulic drive unit 50 is provided at a position separated from the steam valve 1 by a predetermined distance in the horizontal direction when viewed from above.

The hydraulic drive unit 50 is a known hydraulic cylinder device having a drive rod 52, a hydraulic piston 54 mounted on the drive rod 52, and a cylinder 51 covering the drive rod 52 and the hydraulic piston 54 from the outside. The hydraulic piston 54 is connected to the cylinder 51 through a spring 55. An oil feed pipe 56 which supplies hydraulic oil and a discharge pipe 57 which discharges the hydraulic oil are provided at the cylinder 51. The hydraulic piston 54 moves in the vertical direction by pumping the hydraulic oil into the cylinder 51 through the oil feed pipe 56 and the discharge pipe 57. In this way, the drive rod 52 on which the hydraulic piston 54 is mounted is also driven forward and backward in the vertical direction.

Further, the first link unit 10 in the linking device L is rotatably connected to one end of the drive rod 52.

The linking device L has the first link unit 10 connecting the hydraulic drive unit 50 and the valve shaft (the valve shaft rod 74B), the second link unit 20 connecting the hydraulic drive unit 50 and the valve main body 70, and a connection unit 30 connecting the first link unit 10 and the second link unit 20. Further, the linking device L has a bracket 40 which is connected to the first link unit 10, the second link unit 20, and the hydraulic drive unit 50.

The bracket 40 is a plate-shaped member formed in a triangular shape when viewed in an outline view. The bracket 40 has a support portion 43 (a third support portion) which is one of three vertex angles, a first arm portion 41 (a first support portion) extending downward from the support portion 43, and a second arm portion 42 (a second support portion) extending in an approximately horizontal direction from the support portion 43. More specifically, the second arm portion 42 extends in a direction facing away from the cylinder 51 in the horizontal direction.

A hole portion 41A which is a through-hole penetrating the bracket 40 in a thickness direction is provided in the vicinity of an end portion on the lower side of the first arm portion 41. In the same manner, a hole portion 42A is provided in the vicinity of a tip portion of the second arm portion 42. A known spherical bearing is provided in the hole portion 42A of the second arm portion 42.

A concave portion 44A curved toward the inside of the bracket 40 is provided at a side portion connecting the lower end portion of the first arm portion 41 and the tip portion of the second arm portion 42.

The first link unit 10 has a hydraulic link unit 11 which is connected to the drive rod 52 of the hydraulic drive unit 50 at one end thereof, a valve shaft link unit which is connected to the valve shaft 74 (the valve shaft rod 74B) at one end thereof, and a connection piece 13 connecting the other ends of the hydraulic link unit 11 and the valve shaft link unit 12.

The hydraulic link unit 11 is a plate-shaped member formed as a rhombus when viewed in an outline view. Hole portions 11A and 11B are respectively provided in the vicinity of two vertex angles in a longitudinal direction of the hydraulic link unit 11. The hole portions 11A and 11B are holes penetrating the hydraulic link unit 11 in a thickness direction thereof.

Further, a hole portion 11C is provided at the center on a line connecting the two vertex angles. The hole portion 11C is a hole penetrating the hydraulic link unit 11 in the thickness direction thereof.

The valve shaft link unit 12 has the same shape and dimension as those of the hydraulic link unit 11. That is, hole portions 12A and 12B are respectively provided at two vertex angles in a longitudinal direction of the valve shaft link unit 12. Further, a hole portion 12C is provided at the center on a line connecting the vertex angles.

The connection piece 13 is a plate-shaped member formed in an oblong shape when viewed in an outline view. Hole portions 13A and 13B are respectively formed in both end portions in a longitudinal direction of the connection piece 13. Known spherical bearings are respectively provided in the hole portions 13A and 13B.

Next, description will be made with respect to the connection of the hydraulic link unit 11, the valve shaft link unit 12, and the connection piece 13.

An end portion on the hole portion 11A side in the hydraulic link unit 11 is connected to the drive rod 52 through a pin 60 which is inserted into the hole portion 11A. The pin 60 is a rod-shaped member penetrating the hydraulic link unit 11 in the thickness direction. In this way, the hydraulic link unit 11 becomes rotatable around the axis of the pin 60 with respect to the drive rod 52.

An end portion on the hole portion 11B side in the hydraulic link unit 11 is connected to an end portion on the hole portion 13A side in the connection piece 13 through a pin 62 which is inserted into the hole portion 11B. In this way, the hydraulic link unit 11 and the connection piece 13 become rotatable with respect to each other around the axis of the pin 62. Further, the hole portion 11C communicates with the hole portion 41A provided in the bracket 40 described above and a pin 61 is inserted into the hole portion 11C. In this way, the hydraulic link unit 11 becomes rotatable around the axis of the pin 61 with respect to the bracket 40.

Further, an end portion on the hole portion 13B side in the connection piece 13 is connected to an end portion on the hole portion 12A side in the valve shaft link unit through a pin 63 which is inserted into the hole portion 13B. In this way, the valve shaft link unit 12 and the connection piece 13 become rotatable with respect to each other around the axis of the pin 63. Further, an end portion on the hole portion 12B side in the valve shaft link unit 12 is connected to the end portion on the upper side of the valve shaft rod 74B, as described above.

In the first link unit 10 configured as described above, the hydraulic link unit 11, the valve shaft link unit 12, and the connection piece 13 are disposed as follows.

That is, the hydraulic link unit 11 and the valve shaft link unit 12 are disposed so as to extend in an approximately horizontal direction together. Further, the end portion on the hole portion 11B side in the hydraulic link unit 11 is disposed at a position which is lower in the vertical direction than the end portion on the hole portion 12A side in the valve shaft link unit 12. Further, the hydraulic link unit 11 and the valve shaft link unit are disposed such that the hole portion 11B and the hole portion 12A are arranged along the vertical direction.

That is, the steam valve 1 and the hydraulic drive unit 50 are separated from each other by the same distance as an extended dimension in the horizontal direction of the first link unit 10.

Therefore, even in a case where the hydraulic oil of the hydraulic drive unit 50 leaks, the possibility that the hydraulic oil may be scattered on the surface of the steam valve 1 is reduced.

In addition, the hydraulic drive unit 50 is fixed to the steam valve 1, and therefore, each of the oil feed pipe 56 and the discharge pipe 57 can be made to be a fixed pipe. In other words, each of the oil feed pipe 56 and the discharge pipe 57 may not be configured with a flexible pipe. In this way, the reliability of the oil feed pipe 56 and the discharge pipe 57 is secured, and thus the possibility that the hydraulic oil may be scattered is reduced.

The connection piece 13 connects the hydraulic link unit 11 and the valve shaft link unit 12 in the above-described state. In other words, the connection piece 13 is disposed along the vertical direction.

In addition, in this embodiment, the valve shaft 74 in the steam valve 1 is provided along the vertical direction, and therefore, the connection piece 13 is also parallel to an extending direction of the valve shaft 74.

The second link unit 20 is a member having the same dimension and shape as those of the hydraulic link unit 11 and the valve shaft link unit 12 in the first link unit 10. The second link unit 20 connects the rib 80 provided at the upper portion of the valve main body 70 and the second arm portion 42 of the bracket 40. The second link unit 20 has hole portions 20A and 20B in the vicinity of both end portions in a longitudinal direction. Further, a hole portion 20C is provided at the center in the longitudinal direction of the second link unit 20.

An end portion on the hole portion 20A side is disposed so as to communicate with the hole portion 42A provided in the second arm portion 42 of the bracket 40. Further, a pin 64 is inserted into the hole portions 20A and 42A.

The hole portion 20B is provided in an end portion (an end portion which is located in a direction away from the cylinder 51 in the horizontal direction when viewed from the cylinder 51) on the side opposite to the hole portion 20A side. The hole portion 20B is connected to the rib 80 provided in the steam valve 1 through a pin 68. The pin 68 passes through the hole portion 20B of the second link unit 20 and the hole portion 80A of the rib 80.

The second link unit 20 configured as described above and the valve shaft link unit 12 described above are connected to each other by the connection unit 30. The connection unit 30 is an oblong plate-shaped member extending in the vertical direction. Hole portions 30A and 30B are respectively provided in the vicinity of both end portions in the vertical direction of the connection unit 30. More specifically, the hole portion 30A is provided in the vicinity of the end portion on the lower side of the connection unit 30. On the other hand, the hole portion 30B is provided in the vicinity of the end portion on the upper side of the connection unit 30.

The hole portion 30A communicates with the hole portion 12C provided in the valve shaft link unit 12 described above. Further, a pin 65 is inserted into the hole portion 30A. In this way, the valve shaft link unit 12 becomes rotatable around the axis of the pin 65 with respect to the connection unit 30.

Further, the hole portion 30B communicates with the hole portion 20C provided in the second link unit 20. Further, a pin 66 is inserted into the hole portion 30B. In this way, the second link unit 20 becomes rotatable around the axis of the pin 66 with respect to the connection unit 30.

Next, an operation of the steam valve 1 configured as described above will be described.

First, the hydraulic drive unit 50 described above is driven, whereby the linking device L operates. The linking device L connects the hydraulic drive unit 50 and the valve shaft 74, and therefore, the valve shaft 74 performs linear movement in the vertical direction according to the operation of the linking device L.

More specifically, in a case where the drive rod 52 of the hydraulic drive unit 50 moves in the downward direction, the valve shaft 74 also moves in the downward direction through the linking device L. In this way, the valve body 73 provided at the tip of the valve shaft 74 comes into contact with the valve seat 72 provided in the valve main body 70, thereby shutting off the steam flow path 9.

On the other hand, in a case where the drive rod 52 moves in the upward direction, the valve shaft 74 also moves in the upward direction. In this way, the valve body 73 is separated from the valve seat 72, and therefore, the steam flow path 9 is opened.

An operation of the linking device L at this time will be described below. First, an operation of the linking device L in a case where the hydraulic drive unit is driven and thus the drive rod 52 moves in the downward direction will be described.

First, if the drive rod 52 moves in the downward direction, the hydraulic link unit 11 of the first link unit 10 rotates in a clockwise direction with the pin 61 as the center. At the same time, the connection piece 13 connected to the hydraulic link unit 11 by the pin 62 moves in the upward direction.

In this way, the valve shaft link unit 12 connected to the connection piece 13 by the pin 63 rotates in a counterclockwise direction with the pin 65 as the center.

At the same time, the valve shaft rod 74B (the valve shaft 74) connected to the valve shaft link unit 12 by a pin 67A moves in the downward direction. In this way, the valve body 73 provided at the tip of the valve shaft 74 comes into contact with the valve seat 72 provided in the valve main body 70.

Next, an operation of the linking device L in a case where the drive rod 52 moves in the upward direction will be described.

First, if the drive rod 52 moves in the upward direction, the hydraulic link unit 11 of the first link unit 10 rotates in the counterclockwise direction with the pin 61 as the center. At the same time, the connection piece 13 connected to the hydraulic link unit 11 by the pin 62 moves in the downward direction.

In this way, the valve shaft link unit 12 connected to the connection piece 13 by the pin 63 rotates in the clockwise direction with the pin 65 as the center.

At the same time, the valve shaft rod 74B (the valve shaft 74) connected to the valve shaft link unit 12 by the pin 67A moves in the upward direction. In this way, the valve body 73 provided at the tip of the valve shaft 74 is separated from the valve seat 72 provided in the valve main body 70.

As described above, the hydraulic drive unit 50 performs the opening and closing of the steam valve 1 through the linking device L.

Next, the operations of the steam valve 1 and the steam valve opening and closing mechanism M during the operation of the steam turbine 100 will be described.

During the operation of the steam turbine 100, compressed steam of about 500 degree C. flows in the interior of the steam flow path 9 which includes the steam valve 1. In particular, in the turbine main body 2, high-temperature and high-pressure steam flows. Due to the heat, the steam turbine 100 causes slight deformation or displacement.

Figure 2:
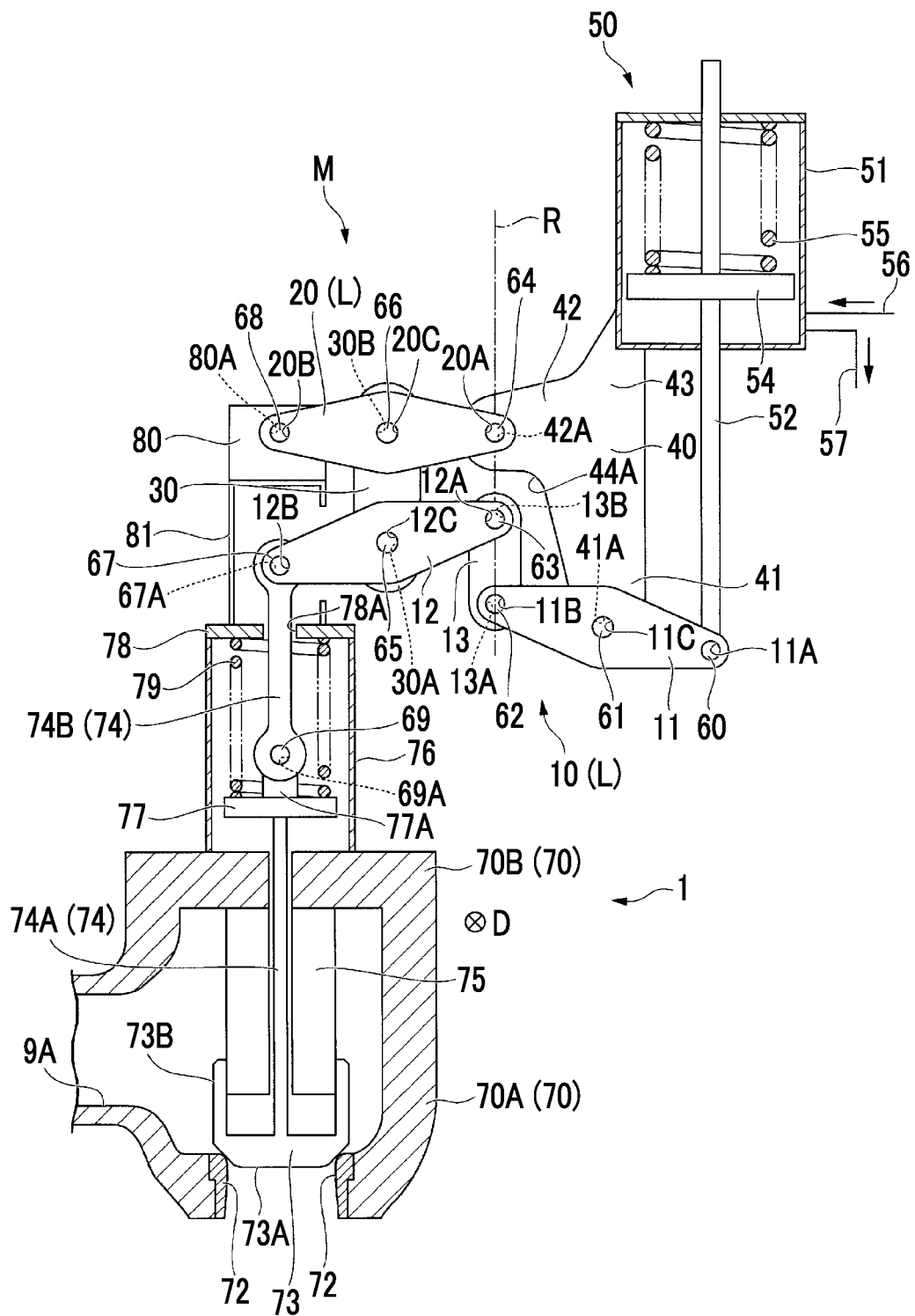
FIG. 2 is a sectional view when the steam valve according to the embodiment of the present invention is viewed from a horizontal direction.

In this embodiment, the turbine main body 2 is disposed on the rear side of an arrow D in FIG. 2, that is, in the front of the illustration. That is, in a case where the turbine main body 2 causes displacement by heat (thermal extension), the steam valve 1 is slightly displaced in the direction of the arrow D. More specifically, the valve main body 70 of the steam valve 1 is displaced in the direction of the arrow D.

Here, as described above, the valve shaft 74 (the valve shaft rod 74B) is connected to the first link unit 10. On the other hand, the valve main body 70 is connected to the second link unit 20 through the tubular body 76. Further, the first link unit 10 and the second link unit 20 are connected by the connection unit 30.

Therefore, the displacement generated in the valve main body 70 is transmitted to the second link unit 20 and then transmitted to the first link unit 10 through the connection unit 30. Further, the displacement transmitted to the first link unit 10 is transmitted to the valve shaft 74. In other words, the same degree of displacement as that of the displacement generated in the valve main body 70 is transmitted to the valve shaft 74 as well.

On the other hand, in a case where the first link unit 10 and the second link unit 20 are not connected by the connection unit 30, the transmission of displacement as described above does not occur. That is, although displacement occurs in the valve main body 70, the displacement is not transmitted to the valve shaft 74. Therefore, deviation occurs in the relative positional relationship between the valve body 73 provided at the tip of the valve shaft 74 and the valve seat 72 provided in the valve main body 70. Due to this, the valve body 73 and the valve seat 72 cannot appropriately come into contact with each other, and thus there is a possibility that the shut-off of the steam flow path 9 by the steam valve 1 may not be appropriately performed. In addition, even in a state where the steam valve 1 is opened, the valve shaft 74 is shifted (is subjected to misalignment) with respect to the guide section 75, and therefore, there is possibility that the steam valve 1 may not be able to be appropriately opened and closed.

However, in the steam valve 1 according to this embodiment and the steam valve opening and closing mechanism M, as described above, the first link unit 10 connected to the valve shaft 74 and the second link unit connected to the valve main body 70 are connected to each other by the connection unit 30. Due to this, displacement (movement) in the horizontal direction (the direction of the arrow D) generated in the valve main body 70 is transmitted to the valve shaft 74 and the valve body 73.

Accordingly, the valve body 73 and the valve seat 72 can appropriately come into contact with each other and the valve shaft 74 does not cause shift with respect to the guide section 75. Therefore, it is possible to appropriately perform the opening and closing of the steam valve 1.

Further, in the steam valve 1 according to this embodiment and the steam valve opening and closing mechanism M, the hydraulic link unit 11 and the valve shaft link unit 12 in the first link unit 10 are connected by the connection piece 13.

In addition, the connection piece 13 is disposed so as to extend along the vertical direction. In this way, the pins 62 and 63 of the connection piece 13 extend along the vertical direction. Further, the pin 64 provided at the bracket 40 is also disposed on an extended line of a line passing through the pins 62 and 63. In other words, all of the pins 62 and 63 of the connection piece 13 and the pin 64 of the bracket 40 are disposed on an imaginary line R extending in the vertical direction.

Additionally, spherical bearings are disposed in the hole portions 13A and 13B and the hole portion 42A supporting the pins 62, 63, and 64.

According to such a configuration, the valve shaft link unit 12 of the first link unit 10 and the second link unit 20 can slightly rotate around the imaginary line R on a horizontal plane. Therefore, even in a case where displacement in the horizontal direction occurs in the valve main body 70 and the valve shaft 74, the spherical bearings disposed in the hole portions 13A and 13B and the hole portion 42A permits the displacement. Due to this, even in a case where the steam valve 1 causes displacement during the operation of the steam turbine 100, the linking device L can appropriately operate, and thus it is possible to appropriately perform the opening and closing of the steam valve 1.

The embodiment of the present invention has been described above in detail with reference to the drawings. However, a specific configuration is not limited to the embodiment, and changes in design or the like in a scope which does not depart from the gist of the present invention are also included in the present invention.

INDUSTRIAL APPLICABILITY

The steam valve according to the present invention can be applied to a steam turbine.

REFERENCE SIGNS LIST

1: STEAM VALVE
2: TURBINE MAIN BODY
3: COMPRESSOR
4: ROTOR
5: BEARING
6: ROTARY SHAFT
8: BLADE
9: STEAM FLOW PATH
9A: STEAM INTRODUCTION PORT
9B: STEAM SUPPLY PORT
10: FIRST LINK UNIT
11: HYDRAULIC LINK UNIT
11A, 11B, 11C: HOLE PORTION
12: VALVE SHAFT LINK UNIT
12A, 12B, 12C: HOLE PORTION
13: CONNECTION PIECE
13A, 13B: HOLE PORTION
20: SECOND LINK UNIT
20A, 20B, 20C: HOLE PORTION
30: CONNECTION UNIT
30A, 30B: HOLE PORTION
40: BRACKET
41: FIRST ARM PORTION (THIRD SUPPORT PORTION)
41A: HOLE PORTION
42: SECOND ARM PORTION (SECOND SUPPORT PORTION)
42A: HOLE PORTION
43: SUPPORT PORTION (FIRST SUPPORT PORTION)
44: CONCAVE PORTION
50: HYDRAULIC DRIVE UNIT
51: CYLINDER
52: DRIVE ROD
54: HYDRAULIC PISTON
55: SPRING
56: OIL FEED PIPE
57: DISCHARGE PIPE
60, 61, 62, 63, 64, 65, 66, 67A, 68, 69A: PIN
67, 69: HOLE PORTION
70: VALVE MAIN BODY
70A: VALVE CASING
70B: LID BODY
72: VALVE SEAT
73: VALVE BODY
74: VALVE SHAFT
74A: VALVE SHAFT MAIN BODY
74B: VALVE SHAFT ROD
75: GUIDE SECTION
76: TUBULAR BODY
77: PISTON
78: TUBULAR BODY COVER
79: STEAM VALVE SPRING
80: RIB
80A: HOLE PORTION
81: RIB SUPPORT STRUCTURE
100: STEAM TURBINE
D: ARROW
L: LINKING DEVICE
M: STEAM VALVE OPENING AND CLOSING MECHANISM
R: IMAGINARY LINE
V: ADJUSTING VALVE

The invention claimed is:
1. A steam valve comprising:
a valve main body which has, on the inside thereof, a flow path through which steam flows, and has a valve seat formed in a portion of the flow path;
a valve body which comes into contact with the valve seat, thereby shutting off the flow path, and is separated from the valve seat, thereby opening the flow path;
a valve shaft which is connected to the valve body, extends in an upward direction from the valve body, and moves up and down, thereby bringing the valve body into contact with the valve seat and separating the valve body from the valve seat;
a hydraulic drive unit which is disposed to be separated in a horizontal direction from the valve main body, at a position which does not overlap the valve main body in a case of being viewed from above, and has a drive rod which is driven forward and backward by oil pressure;
a first link unit which connects the drive rod and the valve shaft and transmits the forward and backward drive of the drive rod to the valve shaft, thereby moving the valve shaft up and down;
a second link unit connected to the valve main body; and
a connection unit which connects the second link unit and the first link unit and transmits a movement of the valve main body in the horizontal direction to the first link unit through the second link unit.

2. The steam valve according to claim 1, wherein the first link unit has
- a valve shaft link unit connected to the valve shaft at one end thereof,
- a hydraulic link unit connected to the hydraulic drive unit at one end thereof, and
- a connection piece which connects the other end of the valve shaft link unit and the other end of the hydraulic link unit through respective spherical bearings, and the steam valve further comprises:
- a bracket having a plurality of support portions, in which a first support portion is connected to the hydraulic link unit, a second support portion is connected to the second link unit through a spherical bearing, and a third support portion is connected to the hydraulic drive unit.

3. The steam valve according to claim 2, wherein the connection piece extends along a vertical direction, and
- the second support portion is disposed on an extended line in an extending direction of the connection piece.

4. A steam turbine comprising:
the steam valve according to claim 3.

5. A steam turbine comprising:
the steam valve according to claim 2.

6. A steam turbine comprising:
the steam valve according to claim 1.

* * * * *